Figure 1:
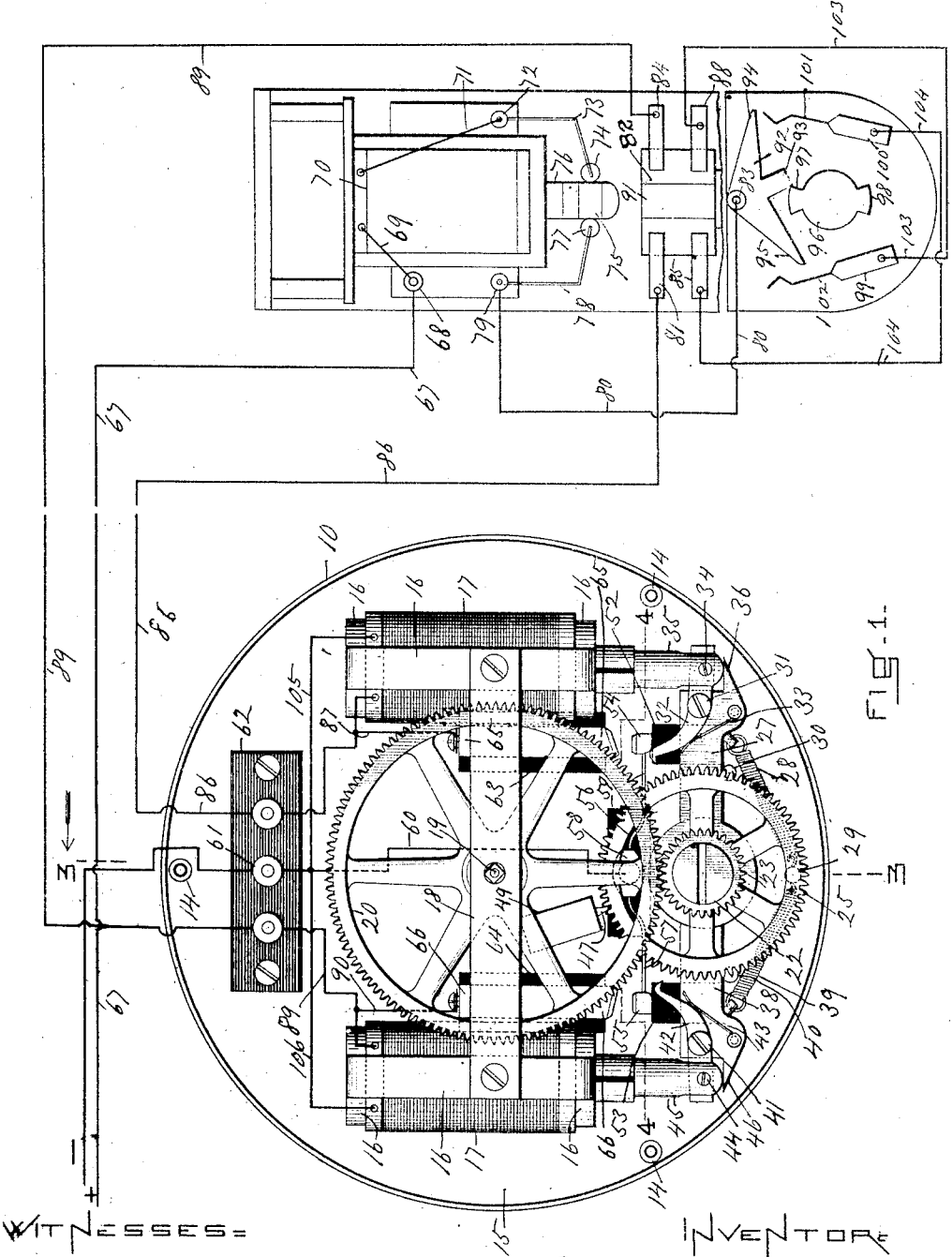

P. F. McAVINNEY.
ELECTROMECHANICAL INDICATOR.
APPLICATION FILED DEC. 21, 1910.

1,005,259.

Patented Oct. 10, 1911.

3 SHEETS—SHEET 1.

WITNESSES:
M. A. Atwood
Frank G. Parker

INVENTOR
Patrick F. McAvinney
By
Atty.

P. F. McAVINNEY.
ELECTROMECHANICAL INDICATOR.
APPLICATION FILED DEC. 21, 1910.

1,005,259.

Patented Oct. 10, 1911.

3 SHEETS—SHEET 2.

UNITED STATES PATENT OFFICE.

PATRICK F. McAVINNEY, OF BOSTON, MASSACHUSETTS, ASSIGNOR TO COFFIN VALVE COMPANY, OF BOSTON, MASSACHUSETTS, A CORPORATION OF MAINE.

ELECTROMECHANICAL INDICATOR.

1,005,259.

Specification of Letters Patent.

Patented Oct. 10, 1911.

Application filed December 21, 1910. Serial No. 598,659.

*To all whom it may concern:*

Be it known that I, PATRICK F. McAVINNEY, a citizen of the United States, residing at Boston, in the county of Suffolk and State of Massachusetts, have invented new and useful Improvements in Electromechanical Indicators, of which the following is a specification.

This improved electro-mechanical indicator is intended and adapted primarily to indicate the position of a gate-valve whereby an accurate knowledge may be had at all times of the amount of water flowing through the valve. In indicators of this class, which may or may not be at a considerable distance from the valve, there is an electrical connection with the motor-controlled gate-valve or sluice-gate, the movements of which and its open or closed position being intended to be indicated on a suitable dial. I do not limit this invention however to use in connection with a gate-valve, as it may be employed as an indicator of movement of valve-stems, or other mechanisms adapted to indicate water-levels in reservoirs, ponds or tanks at considerable distances from the indicating device, and it is proposed to apply the present improved indicator wherever it may be found of service.

In practice, electrically equipped gate-valves are usually completely hidden or inaccessible to view during certain periods of operation, and under such circumstances there is but little knowledge or information at headquarters as to the exact position of the valve or the degree that its port is open.

It is one of the objects of this invention to provide mechanism which, when suitably controlled, will exhibit on the dial of the indicator not only whether the valve is completely open or closed, but its position at any and all intermediate points. Thus the exact position of the valve and its movements are portrayed on the indicator, and it is evident that by making the connection with a suitable recording instrument a permanent record of its movements and fluctuations may be secured.

Another object of the invention is to provide mechanism whereby in connection with a suitable controller, the indicator follows accurately and synchronously the reverse movements, however frequent or constant, of the valve or moving part; and moreover the invention is intended in other respects to provide increased efficiency in operation.

The nature of the invention is fully described below, and illustrated in the accompanying drawings, in which—

Figure 2:
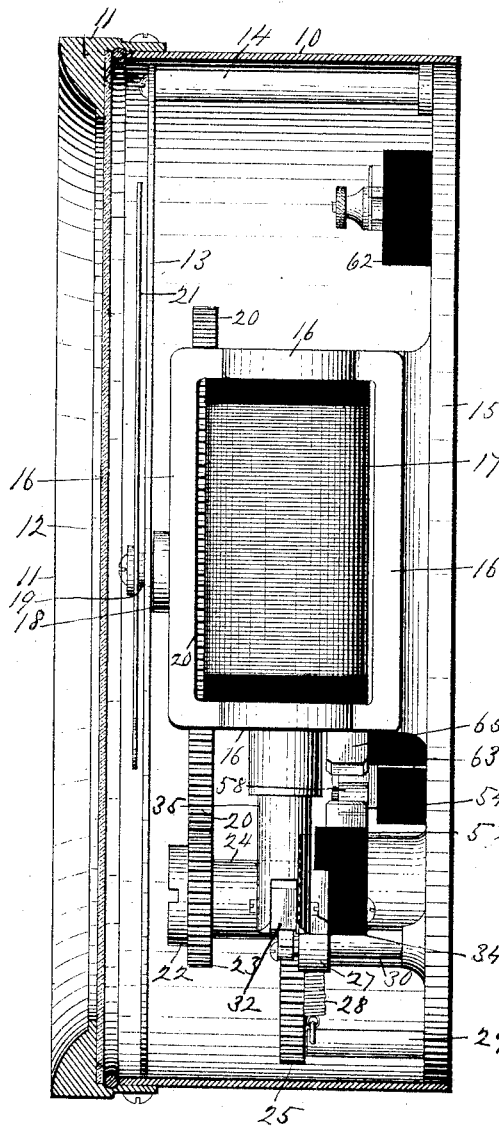
Figure 3:
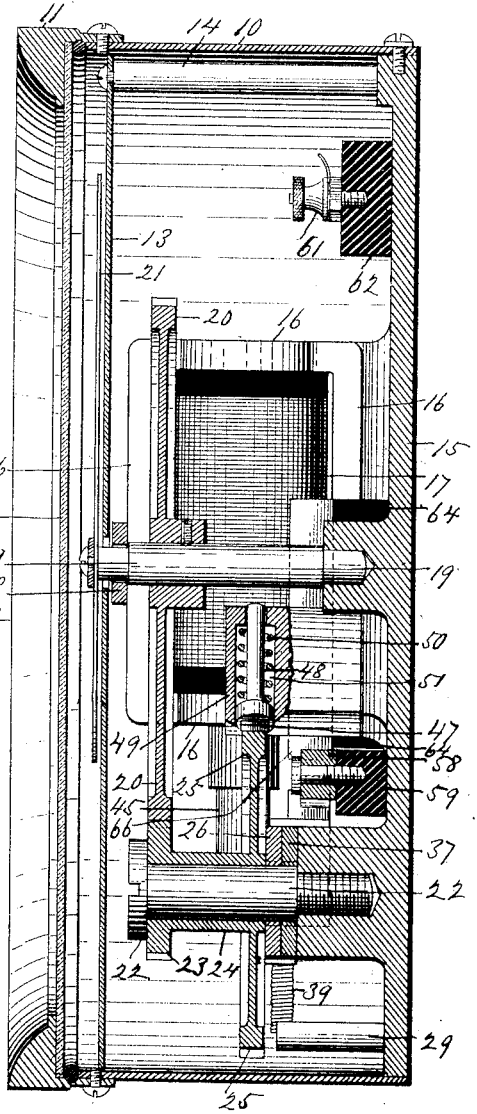
Figure 4:
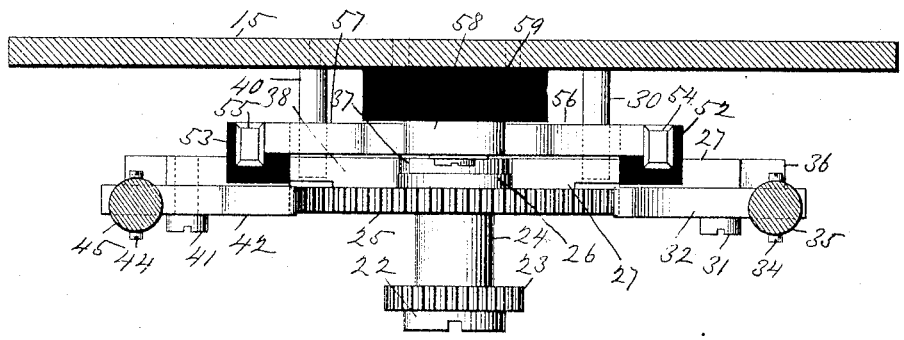

Figure 1 is a view in elevation of my improved electro-mechanical indicator with the front, dial and hand removed, the indicator being illustrated as electrically connected with an actuator or controller shown diagrammatically, an improved controller on these general lines being the subject of a separate application by me for Letters Patent, executed of even date herewith. Fig. 2 is a side elevation, enlarged, the casing being shown in vertical section. Fig. 3 is an enlarged vertical section taken on line 3—3, Fig. 1. Fig. 4 is an enlarged horizontal section taken on line 4—4, Fig. 1.

Similar numerals of reference indicate corresponding parts.

Reference-numeral 10 represents a case containing the mechanism of the indicator, said case being provided with a suitable cover 11 of which 12 is the glass, and 13 a suitable dial or graduated plate supported by lugs 14. From the back 15 of the case extend two brackets 16 each supporting a solenoid 17 at opposite sides of the mechanism, and a bar 18 extends from one bracket or frame 16 to the other in front of the solenoids, said bar supporting one end of a pivot 19 whose opposite end is supported by the back 15 of the case. Rigid on this pivot is a gear-wheel 20, and on the same pivot in front of the dial is a suitable pointer 21.

22 is a horizontal stud supported by the rear plate 15 of the indicator, and loose on this stud is a pinion 23 rigid with the sleeve 24 (Figs. 2, 3 and 4) whose inner end is rigid or integral with a gear-wheel 25. Behind the gear-wheel 25 on the same stud 22 is the hub 26 (Figs. 3 and 4) of a lever 27 (Figs. 1 and 4), the outer portion of said lever being connected by a spring 28 with a pin 29 extending horizontally from the back plate of the case below the stud 22. The downward movement of this lever 27 is limited by a horizontal stop 30 extending from said back plate. Pivoted at 31 to the lever 27 near its outer end is a dog 32, and a spring 33 bears against its inner toothed end. The outer end of this dog is pivoted at 34 to the lower bifurcated end of the core 35 extending down from the solenoid 17 on the right side of the mechanism and the outer end of the lever is provided with a horizontal extension 36 which extends under said core.

37 is a hub on the stud 22 similar to and behind the hub 26 and integral with said hub 37 is a lever 38 exactly like the lever 27, and mechanism 39, 40, 41, 42 and 43 corresponding exactly to the mechanism 28, 30, 31, 32 and 33, the dog 42 being pivotally connected at 44 to the core 45 of the solenoid on the left side of the mechanism. See Figs. 1 and 4. The outer end of the lever 38 is formed with an extension 46 which extends under the core 45. The toothed end 47 (Figs. 1 and 3) of a spring-latch whose shank 48 is held slidingly in a holder 49 supported by the case, is held normally in engagement with the gear-wheel 25 by the spring 50 in the chamber 51 in said holder.

Mounted on the upper surfaces of the two levers 27 and 38 are blocks 52 and 53 respectively made of fiber or other non-conductive material, and resting on the blocks 52 and 53 respectively are metallic contact-blocks 54 and 55 connected by springs 56 and 57 with a central metallic block 58 mounted on a block of insulation 59 secured to the back plate. This conducting block 58 is connected by the negative wire 60 which passes under the binding-post 61 on the block of insulation 62 secured to the back plate, to the source of electricity. Mounted on blocks of insulation 63 and 64 respectively on opposite sides of the center of the back plate of the case are metallic stop-blocks 65 and 66 located directly above the metallic blocks 54 and 55.

The diagrammatic portion of Fig. 1 illustrates an electro-magnetic controller on general lines with that illustrated in the application for Letters Patent above referred to. 67 represents the positive wire connecting the source of electricity with the binding-post 68 which is connected by the wire 69 with the magnet 70, which is connected by a wire 71 with the binding-post 72 connected by a metallic spring 73 with a metallic roll 74 which bears against a metallic ring 75 on the core 76 of the magnet. In contact with this ring 75 is a metallic roll 77 connected by a metallic spring 78 with a binding-post 79 which is connected by a wire 80 with an insulated stud 83. A commutator 82 has four brushes 81, 84, 85 and 88 bearing on its surface, the brush 81 being connected by the wire 86 with the right solenoid, and the brush 84 being connected by the wire 89 with the left solenoid. Pivoted on the stud 83 is a two-way switch 92 having a central projection 93 and contact wings 94, 95. A cam 96 of insulation material provided with projections 97 and 98 is adapted to be rotated in either direction. Contact-blocks 99 and 100 provided with contact-springs 101 and 102 extend on opposite ends of the cam 96, the block 99 being connected by the wire 103 with the brush 88 on one side of the metallic plate 91 making a part of the commutator, and the block 100 being connected by a wire 104 with the brush 85 on the other side of the plate 91.

When by the action of the motor which controls the gate-valve, said motor being mechanically connected with the controller in any suitable manner, the commutator 82 and cam 96 are moved toward the left, an electrical circuit is established through the wire 67, binding-post 68, wire 69, magnet 70, wire 71, binding-post 72, spring 73, roll 74, ring 75, roll 77, spring 78, binding-post 79, wire 80, stud 83, switch 92, spring 101, block 100, wire 104, brush 85, metallic plate 91, brush 81, and wire 86 to the right solenoid, connection also being made by the wire 87 (as above mentioned) with the metallic block 65, and through the wire 105 (Fig. 1) to the wire 60. The effect is to energize the right solenoid 17 and draw up the core or plunger 35, lifting the outer end of the dog 32 and swinging its toothed end into engagement with the gear-wheel 25 against the power of the spring 33. By means of the pivot 31 the outer end of the lever 27 is raised from its seat on the stop 30, swinging the metallic block 54 up into engagement with the metallic block 65, and thus completing the electrical circuit through the blocks 65 and 54, the spring 59, the block 58 and the negative wire 60.

Should the commutator 82 be rotated toward the right thus bringing the metallic plate 91 into contact with the brushes 84 and 88, the current would pass through the wire 67, binding-post 68, wire 69, magnet 70, wire 71, binding-post 72, spring 73, metallic roll 74, metallic ring 75, metallic roll 77, spring 78, binding-post 79, wire 80, stud 83, switch 92, spring 102, block 99, wire 103, brush 88, plate 91, brush 84, and wire 89, to the left solenoid 17, the wire 89 being (as above stated) connected by the wire 90 with the metallic block 66, and said solenoid being connected by the wire 106 to the wire 60. The effect would be to energize the left solenoid, lift the core 45 and the outer end of the dog 42 bringing its toothed end into engagement with the gear-wheel 25 against the power of the spring 43, and by means of the pivot 41 lift the outer end of the lever 38 off its seat on the stop 40, bringing the metallic block 55 up into engagement with the block 66, thus completing the electrical circuit through the blocks 66 and 55, the spring 57, the block 58, and the negative wire 60. Thus the gear-wheel 25 is rotated by either the dog 32 or the dog 42 as the valve is opened or closed, rotation being communicated from said gear-wheel 25 through the pinion 23 to the gear-wheel 20, and by means of the pivot 19 to the indicating hand 21.

The springs 28 and 39 are of course for the purpose of returning the levers 27 and 38 to their original positions. The projecting portions 36 and 46 enable the levers 27 and 38 to limit the downward movement of the cores 35 and 45, thus preventing the toothed end of either dog from swinging too far away from the gear-wheel 25. The spring-latch 47, 48 holds the gear-wheel 25 in position but retracts and slips over its teeth when the wheel is actuated by either of the dogs 32 and 42.

It should be understood that the indicator is adapted to be operated in connection with any suitable controller, the one illustrated diagrammatically simply serving to show one form of controller adapted for the purpose.

Having thus fully described my invention, what I claim, and desire to secure by Letters Patent, is:—

1. In an electro-mechanical indicator of the character described, a pair of solenoids adapted to be electrically connected with a suitable controller and provided with sliding cores, a dial and pointer, a train of gearing for communicating movement to the pointer with relation to the dial, a pair of levers whose hubs turn on a substantially central stud the outer ends of said levers extending toward the cores of the two solenoids and held normally outward to a limited extent by springs, a pair of dogs pivotally connected at their outer ends to the cores and pivotally supported by the levers the inner ends of said dogs being held normally away from one of the gear-wheels in the train, a substantially central insulated block, metallic springs extending outward from said block toward the opposite cores and substantially parallel with the levers, contact-blocks mounted on the outer ends of said springs and resting on blocks of insulation on the levers, metallic insulated bars beyond said contact-blocks from the levers, and a system of wiring including the metallic bars and the solenoids and adapted to extend to the controller whereby when either solenoid is energized and the core thereof thus drawn into the solenoid the lever on that side is drawn with the core bringing the dog on that side into engagement with the gear and the contact-block supported by the spring on that side makes electrical contact with the bar on the same side, for the purpose set forth.

2. In an electro-mechanical indicator of the character described, a pair of solenoids adapted to be electrically connected with a suitable controller and provided with sliding cores, an indicating mechanism, a pair of levers pivotally connected at their inner ends to the case and extending outward toward the cores of the two solenoids, a pair of dogs pivotally connected at their outer ends to the cores and pivotally supported by the levers, a substantially central insulated block, metallic springs extending outward from said block toward the cores, contact-blocks mounted on the outer ends of said springs and insulated from the levers, metallic insulated bars beyond said contact-blocks from the levers, and a system of wiring which includes the metallic bars and the solenoids and is adapted to extend to the controller whereby the energization of either solenoid drawing the core thereof into it brings the dog on that side into engagement with the indicating mechanism operating the same and the contact-block supported by the spring on said side makes electrical contact with the bar on that side, for the purpose set forth.

3. In an electro-mechanical indicator of the character described, a pair of solenoids adapted to be electrically connected with a suitable controller and provided with sliding cores, a dial and pointer, a train of gearing for communicating movement to the pointer with relation to the dial, a pair of levers whose hubs turn on a substantially central stud the outer ends of said levers extending toward the cores of the two solenoids and held normally outward to a limited extent by springs, a pair of dogs pivotally connected at their outer ends to the cores and pivotally supported by the levers the inner ends of said dogs being held normally away from one of the gear-wheels in the train, and duplicate mechanisms insulated from the levers either one of which is adapted to be brought into electrical circuit with the solenoid on that side by the energization of such solenoid producing a withdrawal of the core and a movement of the lever on that side whereby its dog is engaged with the said train of gearing.

4. In an electro-mechanical indicator of the character described, a pair of solenoids adapted to be electrically connected with a suitable controller and provided with sliding cores, a dial and pointer, a train of gearing for communicating movement to the pointer with relation to the dial, a pair of levers whose hubs turn on a substantially central stud the outer ends of said levers extending toward the cores of the two solenoids and held normally outward to a limited extent by springs, said levers being provided with outward extensions under the lower ends of the cores for the support of the latter, a pair of dogs pivotally connected at their outer ends to the cores and pivotally supported by the levers the inner ends of said dogs being held normally away from one of the gear-wheels in the train, and duplicate mechanisms insulated from the levers either one of which is adapted to be brought into electrical circuit with the solenoid on that side by the energization of such solenoid producing a withdrawal of the core and a movement of the lever on that side whereby its dog is engaged with the said train of gearing.

In testimony whereof I have signed my name to this specification in the presence of two subscribing witnesses.

PATRICK F. McAVINNEY.

Witnesses:
HENRY W. WILLIAMS,
M. A. ATWOOD.